(12) United States Patent
Chang

(10) Patent No.: US 6,171,110 B1
(45) Date of Patent: Jan. 9, 2001

(54) TEACHING AID FOR DEVELOPING A CHILD'S INTELLIGENCE

(75) Inventor: Yu-Ti Chang, Taichung Hsien (TW)

(73) Assignee: Li-Hsiang Lu, Taichung (TW)

( * ) Notice: Under 35 U.S.C. 154(b), the term of this patent shall be extended for 0 days.

(21) Appl. No.: 09/456,397

(22) Filed: Dec. 8, 1999

(30) Foreign Application Priority Data

Apr. 9, 1999 (TW) ................................................ 88205609

(51) Int. Cl.[7] ..................................................... G09B 1/28
(52) U.S. Cl. .......................... 434/175; 434/159; 434/167; 446/127
(58) Field of Search .................................... 434/159, 167, 434/171, 175, 177, 199, 208, 258, 259, 403, 405, 406; 446/118, 119, 122, 123, 124, 125, 126, 127, 128; 273/453, 156, 160

(56) References Cited

U.S. PATENT DOCUMENTS

| | | | |
|---|---|---|---|
| 674,486 | * | 5/1901 | Talbot . |
| 1,041,059 | * | 10/1912 | Fox . |
| 1,184,326 | * | 5/1916 | Cress . |
| 1,218,993 | * | 3/1917 | Fox . |
| 1,240,556 | * | 9/1917 | Fox . |
| 5,769,639 | * | 6/1998 | Foster . |

\* cited by examiner

*Primary Examiner*—Jacob K. Ackun
*Assistant Examiner*—Bera B. Miller
(74) *Attorney, Agent, or Firm*—Browdy and Neimark

(57) ABSTRACT

A teaching aid is designed to develop intelligence of the preschoolers and is composed of a base and a plurality of sliding members. The base has a pathway portion which is provided with a plurality of intersecting paths. The sliding members are provided thereon with an alphabet, pattern, or symbol and are selectively slid in the paths of the base to locate at a predetermined position of the pathway portion of the base such that the alphabet, pattern, or symbol of the selectively-slid sliding members form a predetermined word or figure.

8 Claims, 9 Drawing Sheets

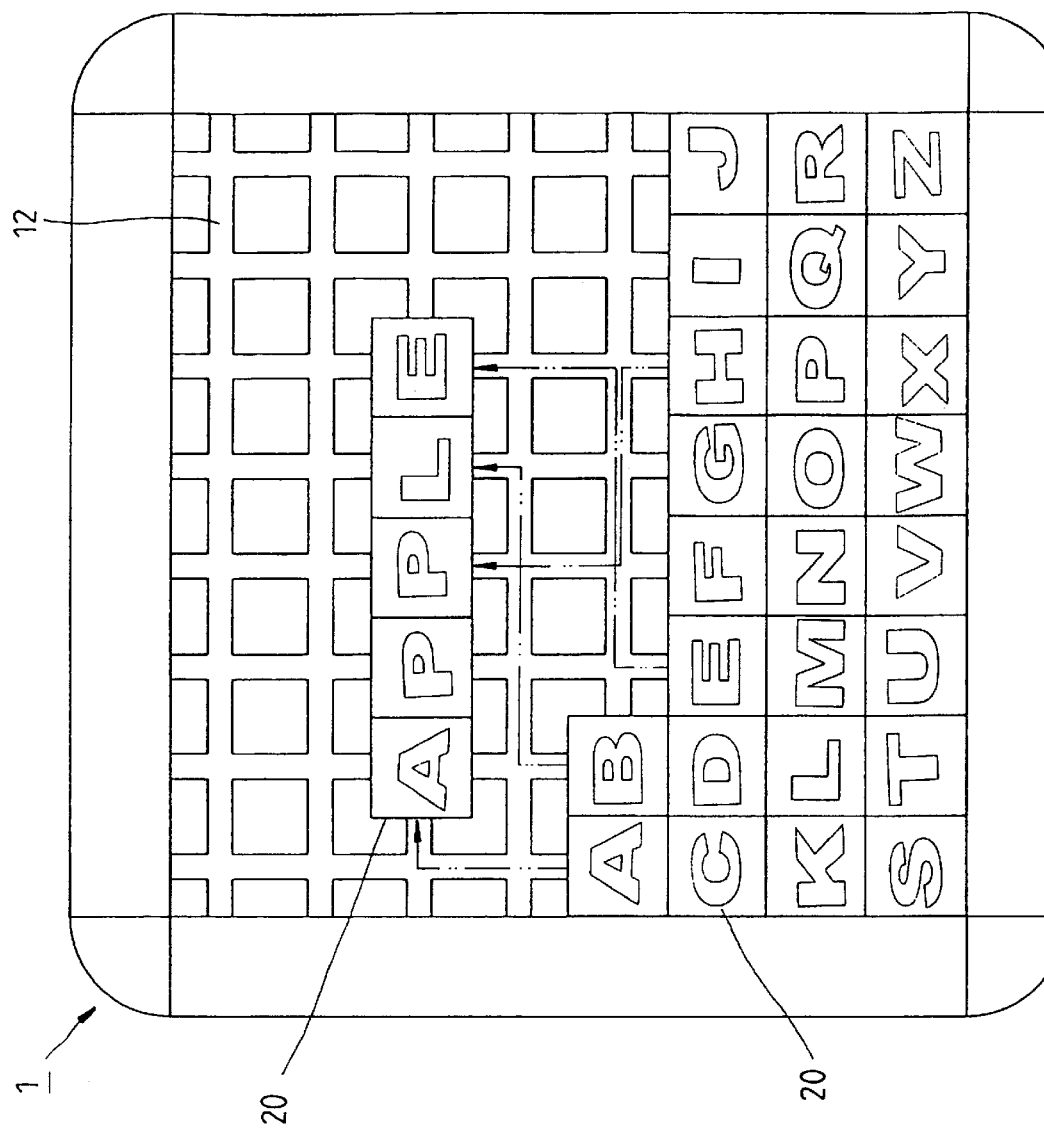
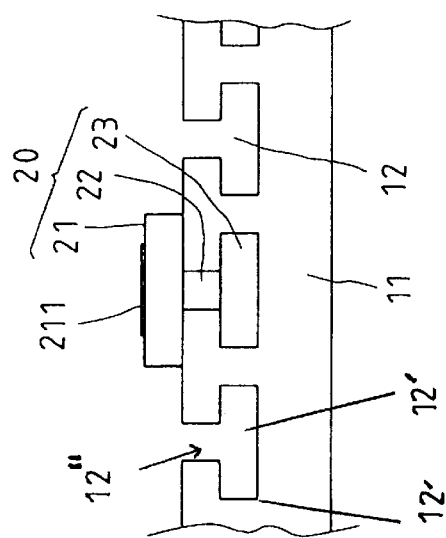
FIG. 4
FIG. 3

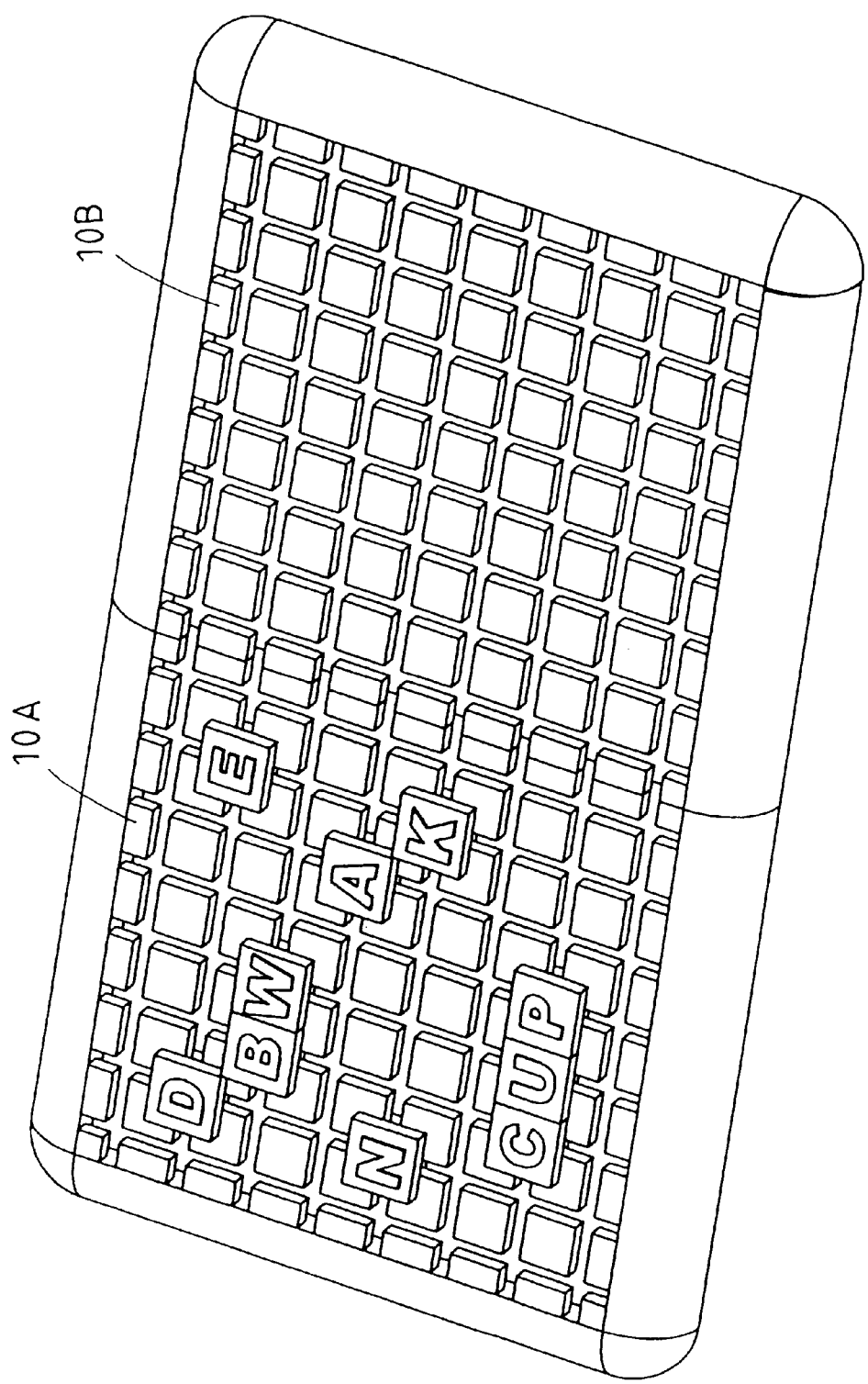

TEACHING AID FOR DEVELOPING A CHILD'S INTELLIGENCE

FIELD OF THE INVENTION

The present invention relates generally to a teaching aid, and more particularly to a teaching aid for developing a child's intelligence.

BACKGROUND OF THE INVENTION

The conventional way of teaching the preschoolers is fixed, mechanical, and monotonous at best. For example, the preschoolers are taught to answer by rote. It is therefore readily apparent that the conventional way of teaching preschoolers is not effective in helping the preschoolers develop their ability to learn or understand from experience. The effective way of teaching the preschoolers must be able to draw the interest of the preschoolers such that they are actively involved in the learning process.

SUMMARY OF THE INVENTION

The primary objective of the present invention is therefore to provide a teaching aid capable of helping a child develop his or her ability to learn or understand from experience.

In keeping with the principle of the present invention, the foregoing objective of the present invention is attained by a teaching aid comprising a base and a plurality of sliding members. The base has a pathway portion consisting of a plurality of intersecting paths in which the sliding members slide. Each of the sliding members carries a word, pattern, or symbol. A child is taught to slide the predetermined sliding members along the predetermined paths to arrive at the predetermined positions of the pathway portion of the base such that the words, patterns, or symbols of these sliding members form a series of words or a figure.

The foregoing objective, features and functions of the present invention will be more readily understood upon a thoughtful deliberation of the following detailed description of two preferred embodiments of the present invention with reference to the accompanying drawings.

BRIEF DESCRIPTION OF THE DRAWINGS

FIG. 3 shows a sectional view taken along the direction indicated by a line 3—3 as shown in FIG. 1.

FIG. 4 shows a schematic view of the first preferred embodiment of the present invention.

FIGS. 5 and 6 are two perspective views of the first preferred embodiment of the present invention in two different modes.

DETAILED DESCRIPTION OF THE INVENTION

Figure 1:
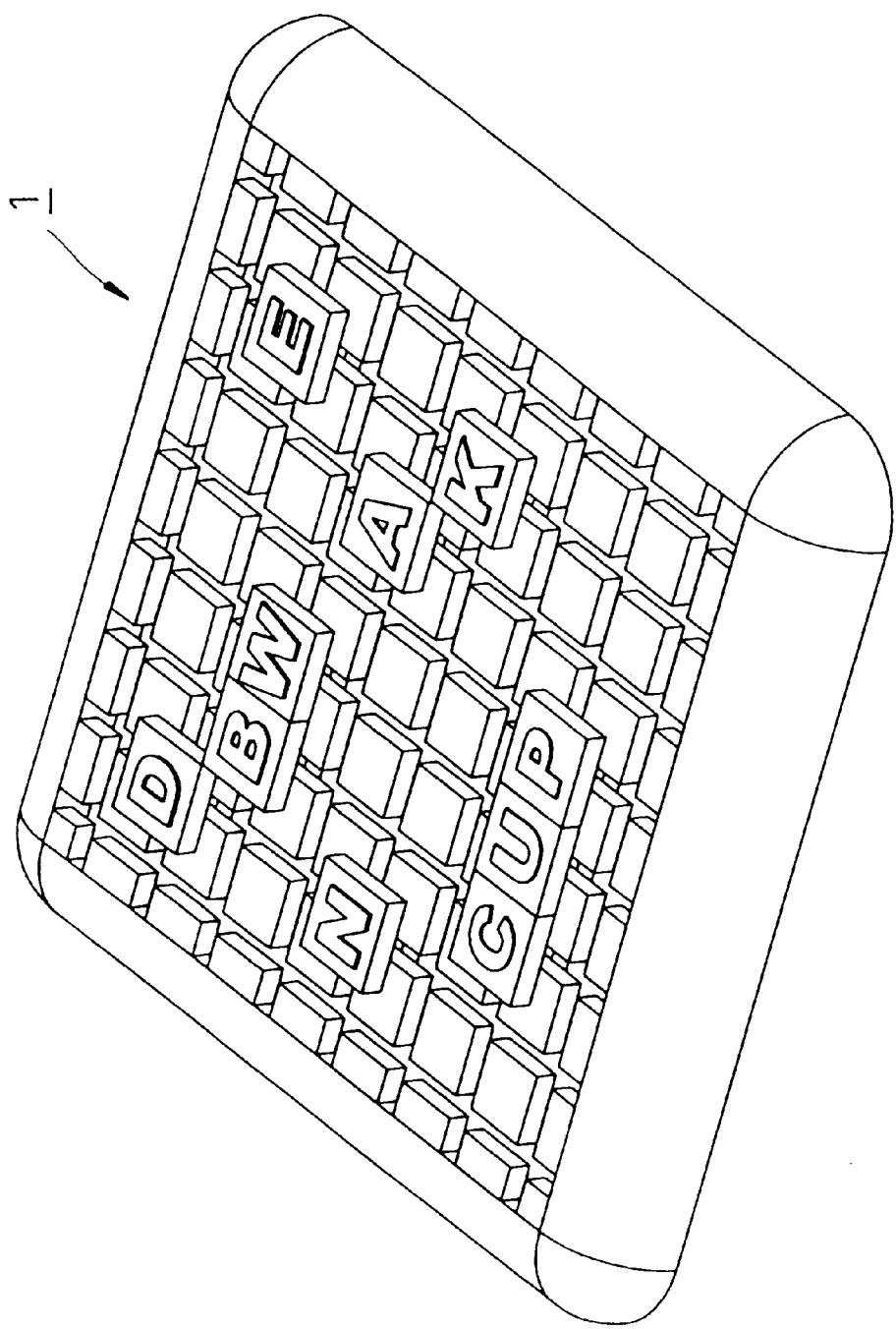
FIG. 1 shows a perspective view of a first preferred embodiment of the present invention.
Figure 2:
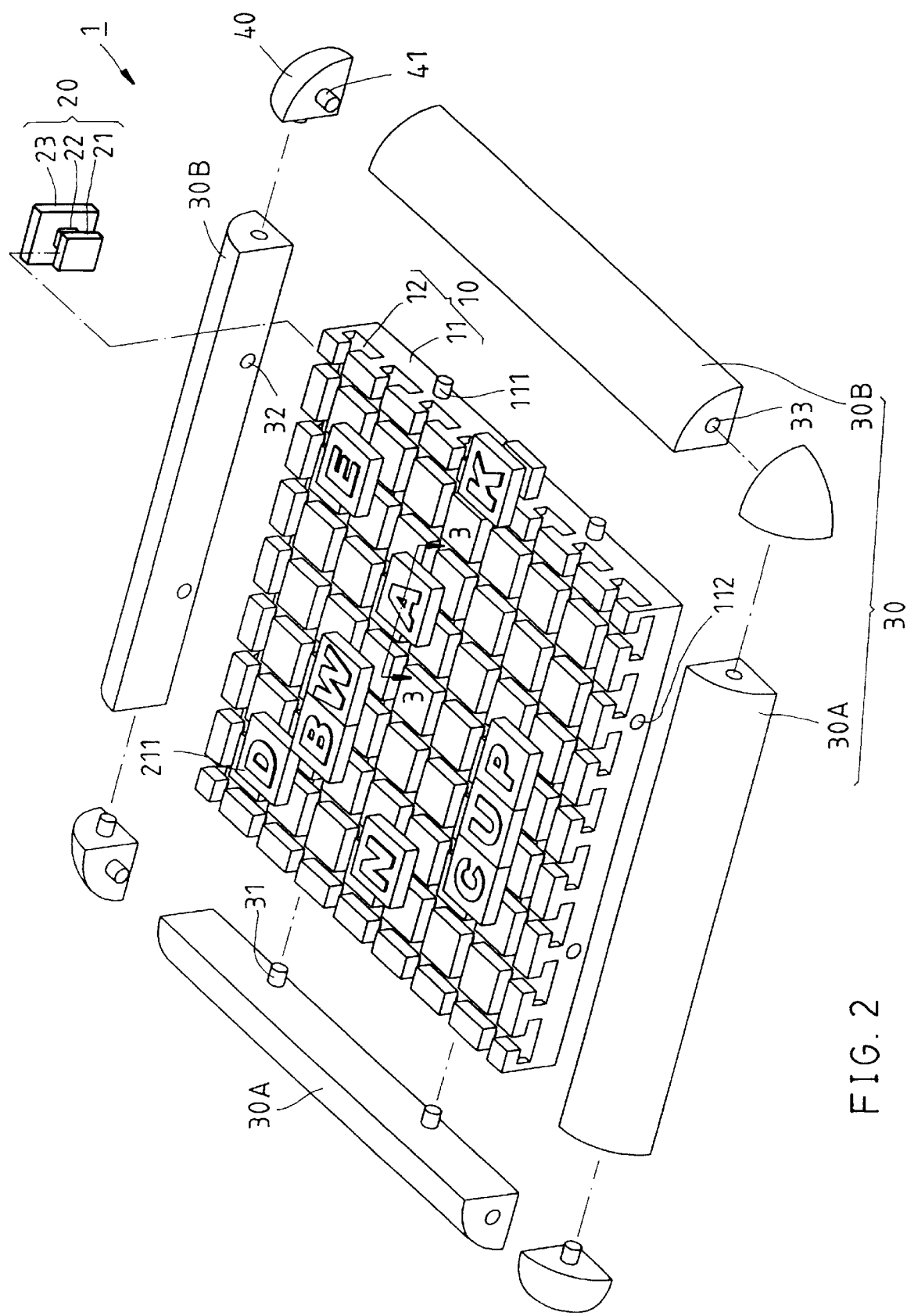
FIG. 2 shows an exploded view of the first preferred embodiment of the present invention.

As shown in FIGS. 1–3, a teaching aid 1 embodied in the present invention is intended for use in developing a child's intelligence and is formed of a base 10, a plurality of sliding members 20, four side bars 30, and four corner blocks 40.

The base 10 has a rectangular base body 11 and a pathway portion. The body 11 has two first side walls contiguous to each other, and two second side walls contiguous to each other. The two first side walls are provided with two tenons 111 separated from each other at an interval. The two second side walls are provided with two mortises 112 separated from each other at an interval. The pathway portion is formed on the upper surface of the base body 11 and is composed of a plurality of intersecting slots 12 equal in length to one another. In other words, the pathway portion of the base 10 consists of a plurality of intersecting paths, which are equal in distance and are formed by the slots 12. As shown in FIG. 3 of the slots 12 has two extremities 12 and a trunk 12, with the extremities being smaller in width than the trunk. In other words, the open ends of the lot 12 are narrower than the trunk portion of the slot 12. The distance between a side wall of the base body 11 and a slot 12 parallel to and most contiguous to the side wall is equal to a half of the distance between two adjoining slots 12.

The sliding members 20 have a rectangular head 21, a rectangular portion 23, and a rectangular neck 22 located between the head 21 and the body portion 23. The head 21 has a length and a width, which are smaller than the distance between the two adjoining slots 12. The head 21 is provided in the top thereof with a raised portion 211 in the form of an English alphabet. The neck 22 has a length and a width, which are slightly smaller than the width of the open ends of the slots 12. The neck 22 further has a height greater than the depth of the open ends of the slot 12. The body portion 23 has a length and a width, which are smaller than the width of the trunk portion of the slots 12. Each of the sliding members 20 is disposed in the slot 12 such that the body portion 23 is received in the trunk portion of the slot 12, and that the neck 22 is located in the open ends of the slot 12, and further that the head 21 is exposed, as shown in FIG. 3. By pushing the head 21 of the sliding member 20, the sliding member 20 is slid in the slots 12 such that the sliding member 20 can be switched from slot to slot and from path to path.

The four side bars 30 are in fact formed of two first side bars 30A and two second side bars 30B. The two first side bars 30A are provided in one side surface thereof with two tenons 31 corresponding in location to the two mortises 112 of the base body 11. The two first side bars 30A are fastened with the two second side walls of the base body 11 by means of the tenons 31 and the mortises 112. The two second side bars 30B are provided in one side surface thereof with two mortises 32 corresponding in location to the two tenons 111 of the base body 11. The two second side bars 30B are fastened with the two first side walls of the base body 11 by means of the mortises 32 and the two tenons 111. In addition, the two first side bars 30A and the two second side bars 30B are provided in the longitudinal ends thereof with a mortise 33, as shown in FIG. 2.

Each of the four corner blocks 40 has two adjoining surfaces which are provided with a tenon 41. Each corner block 40 is fastened with the longitudinal ends of two side bars 30 such that the tenons 41 are received in the mortises 33.

As illustrated in FIG. 4, the teaching aid 1 of the present invention is designed to develop intelligence of the preschool children between the ages of two and five (or six). Before demonstrating the teaching aid 1 of the present invention, all sliding members 20 are put together in one area of the base body 11. Thereafter, the teacher discloses a word "APPLE" for guiding the children to select the correct alphabets among the sliding members 20. Upon having selected the correct alphabets, the children are taught to arrange the correct alphabets in a correct sequence to form the word "APPLE" by sliding the correct sliding members 20 out of the area in which all sliding members 20 are put together. In the midst of sliding the correct sliding members 20 out of the area, the children are likely to encounter with some obstacles of the incorrect sliding members 20, thereby resulting in the development of a child's ability to respond quickly and successfully to the situation. The children are therefore taught to learn or understand from experiences.

Figure 6:
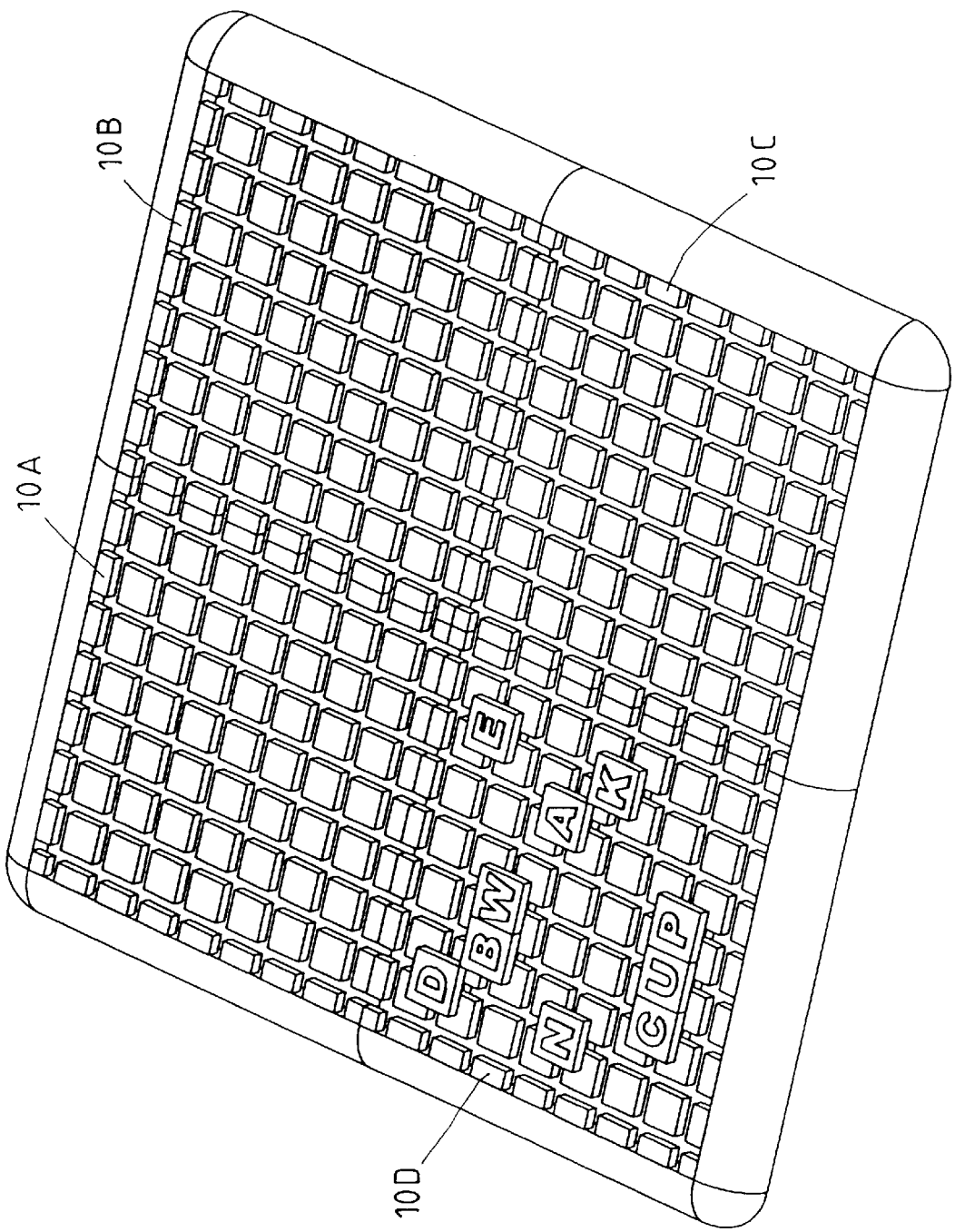
Figure 7:
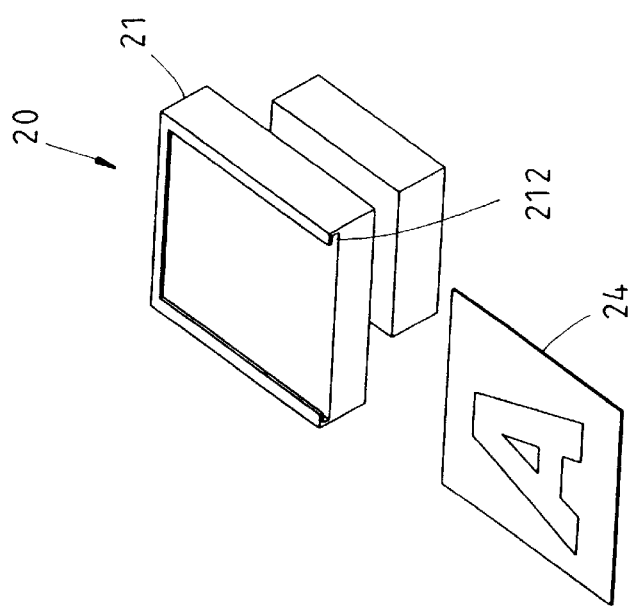
FIG. 7 shows a schematic view of the sliding members of the first preferred embodiment of the present invention at work.
Figure 8:
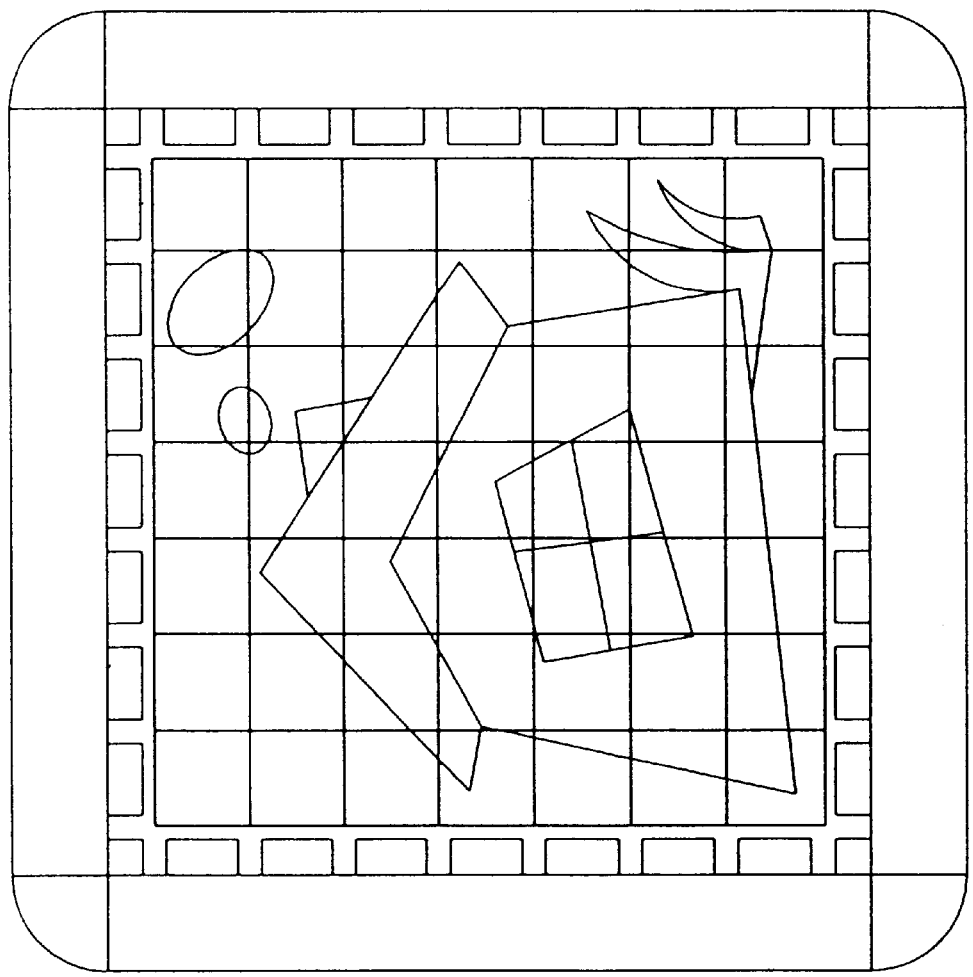
FIG. 8 shows a schematic plan view of the first preferred embodiment of the present invention in one of the two modes.

The teaching aid 1 of the present invention is versatile in design, as shown in FIGS. 5 and 6 in which two or more bases 10A, 10B, 10C, 10D are joined together in conjunction with six or eight side bars 30 as well as four corner blocks 40. The working area of the teaching aid 1 of the present invention is thus expanded. Similarly, the sliding members 20 of the teaching aid 1 of the present invention are adapted to many uses and functions, as shown in FIG. 7 in which the head 21 of the sliding member 20 is shown to have two insertion slots 212 opposite to each other to facilitate the inserting of an insert 24. The insert 24 is removably received in the insertion slots 212. A number of inserts 24 may be provided such that the inserts 24 are various in design, and that various inserts 24 may be put together to form an animal or object, as illustrated in FIG. 8.

Figure 10:
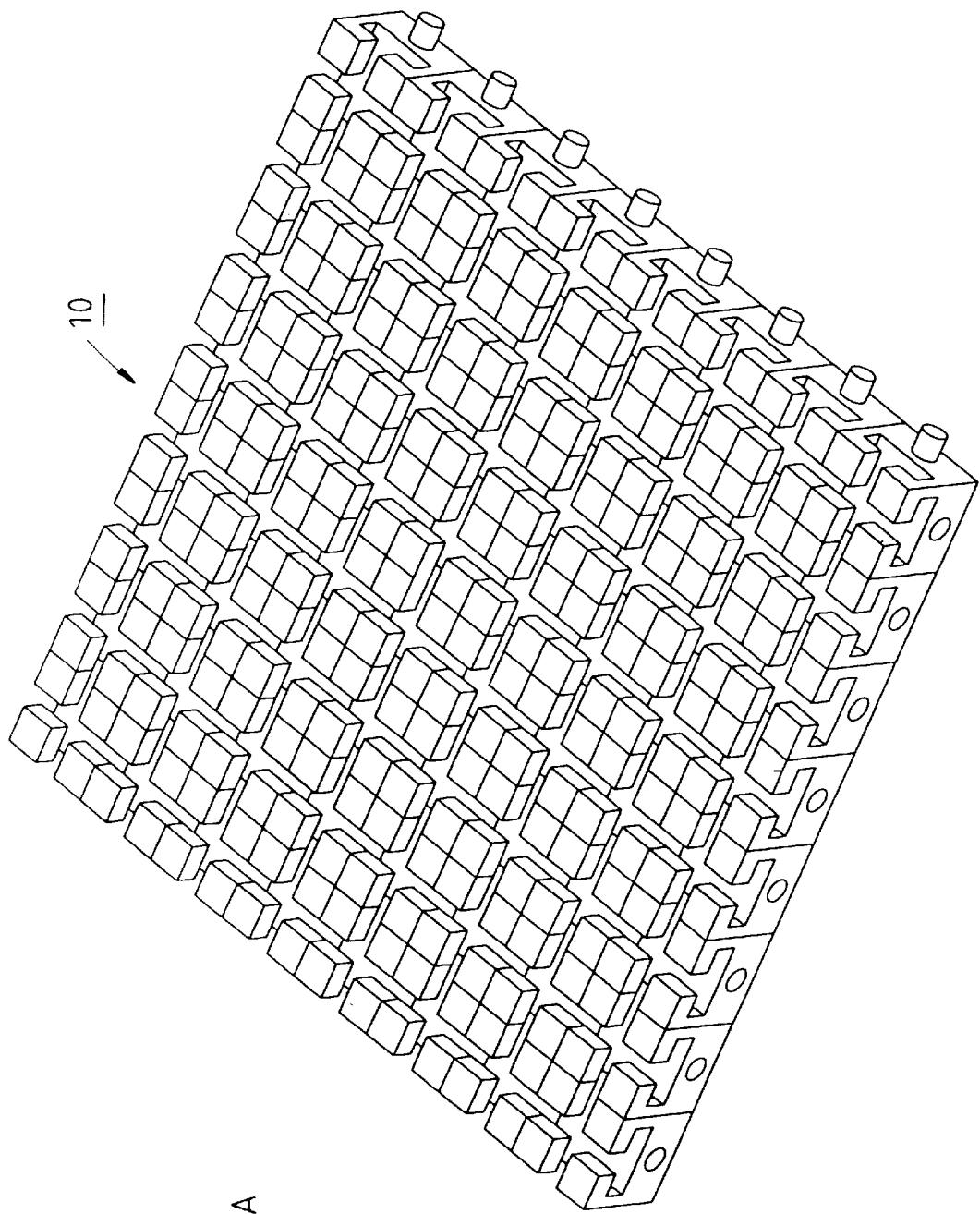
FIG. 10 shows a perspective view of a base formed of the component parts as shown in FIG. 9.
Figure 9:
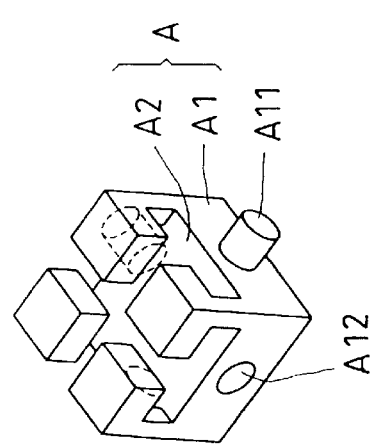
FIG. 9 shows a perspective view of a component part of the base of the first preferred embodiment of the present invention.

As shown in FIGS. 9 and 10, the base 10 of the teaching aid 1 of the present invention may be formed of a plurality of unitary base blocks "A", with each having a rectangular unitary base body A1 and a unitary pathway portion. The unitary base body A1 is provided in two adjoining sides thereof with a tenon A11, and in other two adjoining sides thereof with a mortise A12. The unitary pathway portion is formed of two slot sections A2 which are intersected on the top of the unitary base body A1. The base 10 of the teaching aid 1 is formed of a plurality of unitary base blocks "A" which are joined together by means of the tenons A11 and the mortises A12, as shown in FIG. 10.

Figure 12:
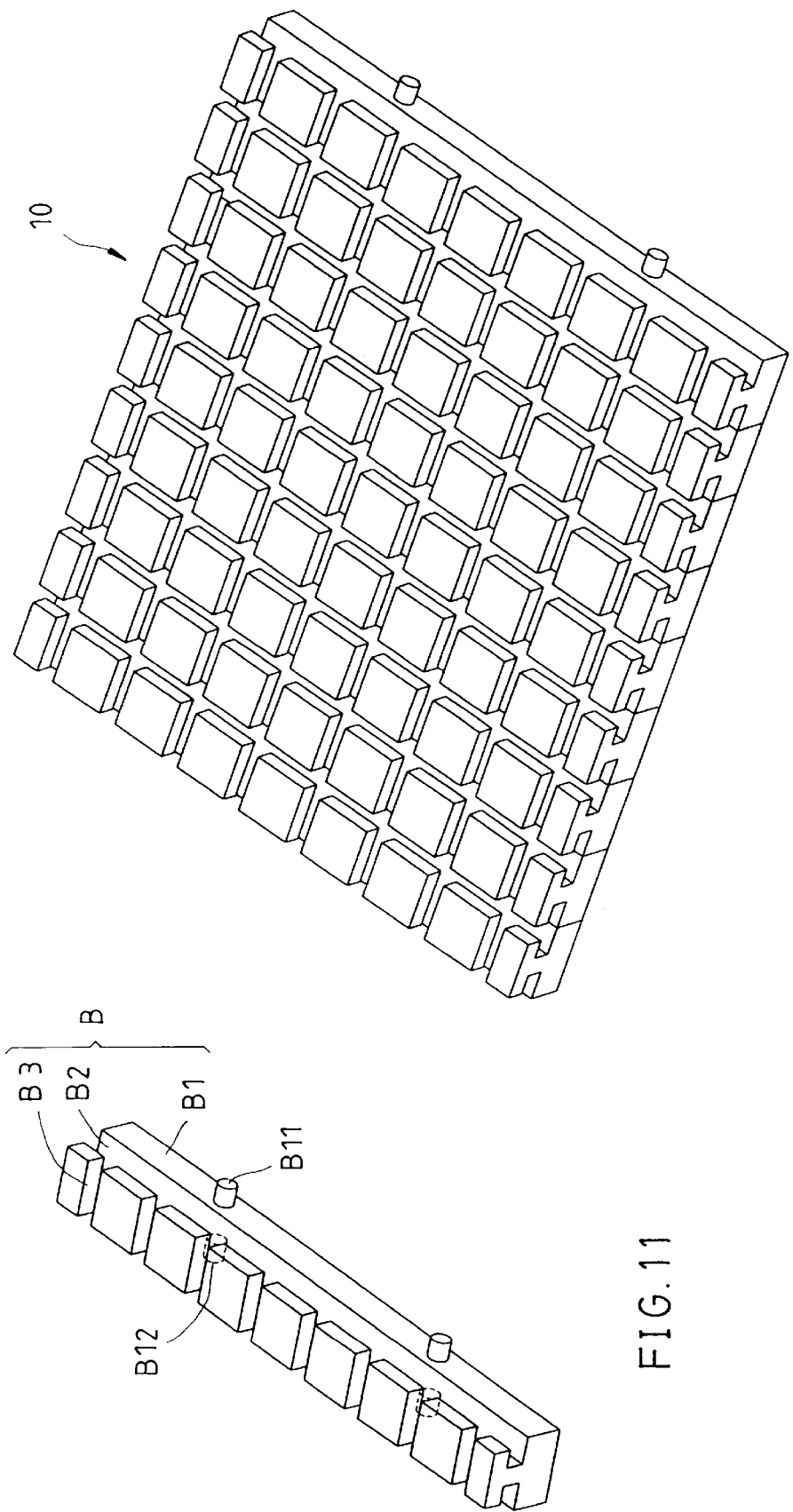
FIG. 12 shows a perspective view of a base formed of the component parts as shown in FIG. 11.
Figure 11:
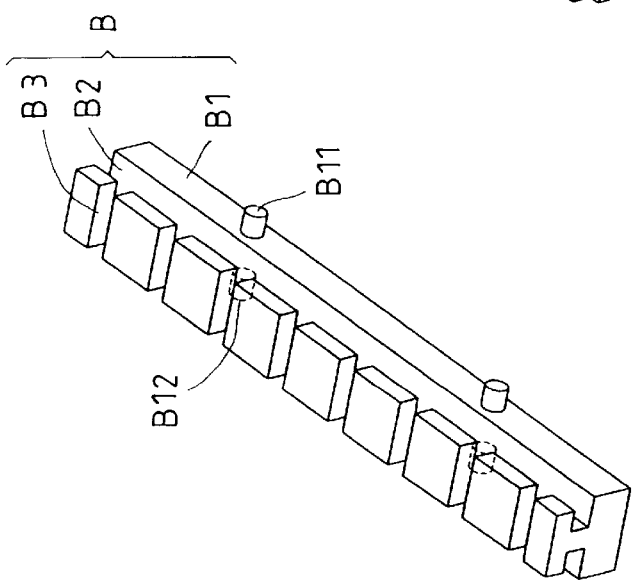
FIG. 11 shows a perspective view of a component part of another form of the base of the first preferred embodiment of the present invention.

As shown in FIGS. 11 and 12, the base 10 of the teaching aid 1 of the present invention may be also formed of a plurality of unitary base "B". Each unitary base bar B has a unitary base body B1 and a unitary pathway portion. The unitary base body B1 is provided in one longitudinal side thereof with two tenons B11, and in other longitudinal side thereof with two mortises B12. The unitary pathway portions is formed of two longitudinal half slot B2 and a plurality of horizontal slot sections B3, which are intersected on the top of the unitary base body B1. A plurality of such unitary base bars "B" are joined together by means of the tenons B11 and the mortises B12 to form the base 10 of the teaching aid 1 of the present invention.

The base 10 may be integrally made of a plastic material by injection molding such that the interior of the base body 11 is covered with a metal piece contiguous to the top of the base body 11. In addition, a magnetic member may be inlaid in the underside of the body 23 of the sliding members 20, thereby enabling the sliding members 20 to be attracted to the base 10. As a result, the sliding members 20 are securely located on the base 10 even if the base 10 is erected, tilted, or impacted.

Figure 13:
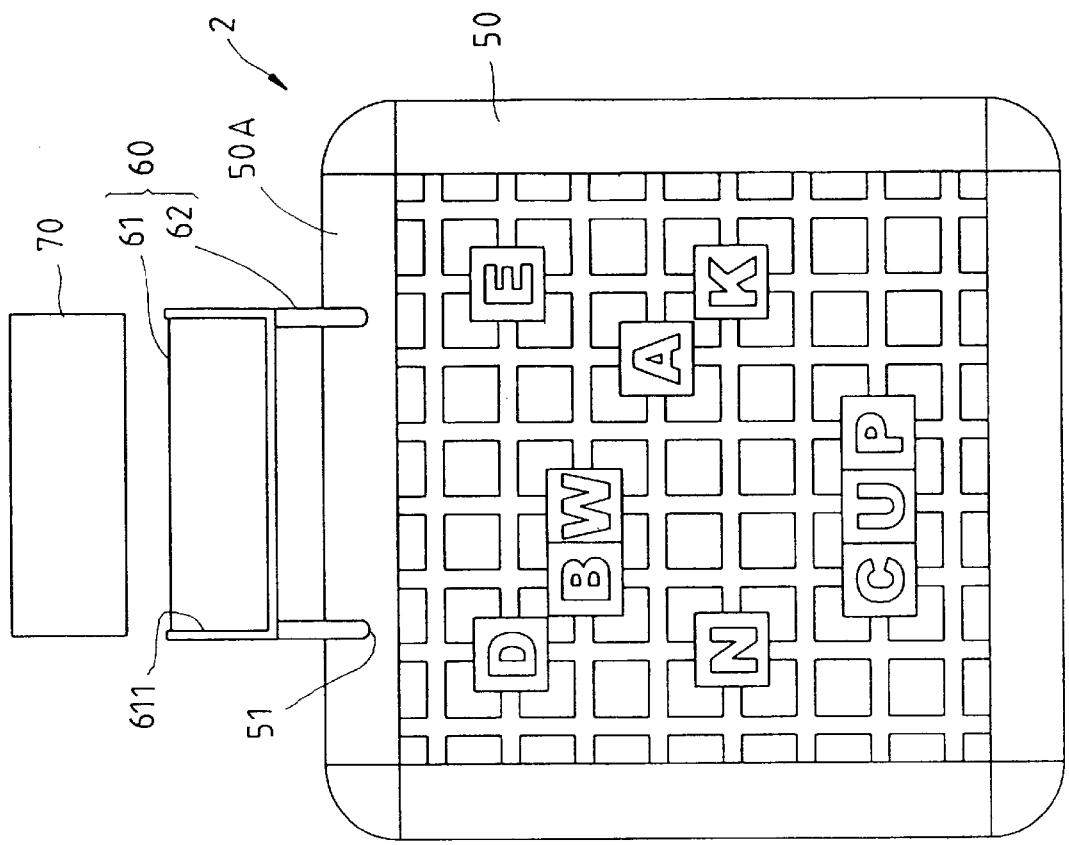
FIG. 13 shows a schematic plan view of a second preferred embodiment of the present invention.

A teaching aid 2 of the second preferred embodiment of the present invention is shown in FIG. 13 and is basically similar in construction to the teaching aid 1 of the first preferred embodiment, except that the former has three side bars 50 and one side bar 50A which is provided with two receiving holes 51, and that the former further has a display member 60 which is formed of a display board 61 and two insertion rods 62 attached to the display board 61. The display member 60 is held by the side bar 50A by the two insertion rods 62 which are received in the two receiving holes 51 of the side bar 50A. The display board 61 is provided with two receiving slots 611 opposite in location to each other for receiving an instruction each 70 on which a predetermined symbol or word is printed.

What is claimed is:

1. A teaching aid for developing a child's intelligence, said teaching aid comprising:

a base having a pathway portion which is provided with a plurality of intersecting paths; and a plurality of sliding members, with each having thereon an alphabet symbol whereby said sliding members are selectively slid in said paths to locate at a predetermined position of said pathway portion of said base such that the alphabet symbol of the selectively-slid sliding members form a predetermined word;

wherein said base has a base body; wherein said paths are intersected on said pathway portion whereby said paths are formed of slots, each of the slots having two extremities and a trunk portion, wherein said sliding members have a rectangular head, a rectangular body, and a rectangular neck connecting said head with said rectangular body, said head having a length and a width which are smaller than a distance between two adjoining slots, said neck having a length and a width which are smaller than the width of said extremities of said slots, said neck further having a height greater than the depth of said extremities of said slots, said rectangular body having a length and a width which are smaller than the width of said trunk portion of said slots, said sliding members being slidably disposed in said slots such that said rectangular body of said sliding members is received in said trunk portion of said slots, and that said neck is located at said extremities of said slots, and further that said head is exposed, and further that said sliding members are slid from one of said slots to another by pushing said head;

wherein said base body has two first side walls which are contiguous to each other and are provided with two tenons, said base body further having two second side walls which are contiguous to each other and provided with two mortises; and wherein one of said slots is parallel to and most contiguous to one of said side walls and is separated from one side wall by a distance which is equal to a half of a distance between two adjoining slots.

2. The teaching aid as defined in claim 1 further comprising four side bars and four corner blocks, said four side bars including two first side bars and two second side bars, said two first side bars being provided in one side thereof with two tenons which are received in said two mortises of said second side wall, said two second side bars being provided in one side wall, said two mortises which receives said two tenons of said first side wall, said two first side bars and said two second side bars being provided at both ends thereof with a mortise, said four corner blocks provided in two adjoining sides thereof with a tenon whereby each of said four corner blocks is joined with two ends of two adjoining side bars such that said tenons of said four corner block are received in said mortises of said ends of said adjoining side bars.

3. The teaching aid as defined in claim 2, wherein one of said four side bars is provided with two receiving holes, and a display member attached thereto whereby said display member has a display board with two insertion rods fastened thereto, said display member being attached to said one side bar such that said two insertion rods of said display board of display member are received in said two receiving holes of said one side bar, said display board provided with two receiving slots opposite to each other for receiving removably an instruction card.

4. The teaching aid as defined in claim 1, wherein the alphabet, symbol of said sliding members is located on a top of said head of said sliding members.

5. The teaching aid as defined in claim 1, wherein a top of said head thereof has two receiving slots opposite to each other for removably receiving a card with a predetermined symbol being printed thereon.

6. The teaching aid as defined in claim 1, wherein said base is formed of a plurality of unitary base blocks, with each having a rectangular unitary base body and a unitary pathway portion, said unitary base body provided in two adjoining sides thereof with a tenon and in other two adjoining sides thereof with a mortise, said unitary pathway portion formed of two slot sections whereby said two slot sections are intersected on the top of said unitary base body.

7. The teaching aid as defined in claim 1, wherein said base is formed of a plurality of base bars, with each having a unitary base body and a unitary pathway portion, said unitary base body provided in one longitudinal side thereof with two tenons and in other longitudinal side thereof with two mortises, said unitary pathway portion being of two longitudinal half slot and a plurality of horizontal slot sections which are intersected on the top of said unitary base body.

8. The teaching aid as defined in claim 1, wherein said base is integrally made of a plastic material by injection molding such that the interior of said base body is covered with a metal piece contiguous to the top of said base body; and wherein said body of said sliding members is provided in an underside thereof with a magnetic member inlaid therein for locating said body on said base.

* * * * *